United States Patent
Ganesan

(10) Patent No.: US 10,685,751 B2
(45) Date of Patent: Jun. 16, 2020

(54) FLOATING NUCLEAR POWER REACTOR WITH A SELF-COOLING CONTAINMENT STRUCTURE AND AN EMERGENCY HEAT EXCHANGE SYSTEM

(71) Applicant: Palvannanathan Ganesan, Omaha, NE (US)

(72) Inventor: Palvannanathan Ganesan, Omaha, NE (US)

( * ) Notice: Subject to any disclaimer, the term of this patent is extended or adjusted under 35 U.S.C. 154(b) by 381 days.

(21) Appl. No.: 15/807,049

(22) Filed: Nov. 8, 2017

(65) Prior Publication Data

US 2019/0139657 A1  May 9, 2019

(51) Int. Cl.
  *G21C 11/04* (2006.01)
  *G21C 15/18* (2006.01)
  *G21C 13/024* (2006.01)
  *G21C 15/12* (2006.01)
  *G21D 1/00* (2006.01)

(52) U.S. Cl.
  CPC ............ *G21C 11/04* (2013.01); *G21C 13/024* (2013.01); *G21C 15/18* (2013.01); *G21C 15/12* (2013.01); *G21D 1/00* (2013.01)

(58) Field of Classification Search
  CPC ...... G21C 15/18; G21C 13/02; G21C 13/024; G21C 11/04
  See application file for complete search history.

(56) References Cited

U.S. PATENT DOCUMENTS

| | | | | |
|---|---|---|---|---|
| 3,986,367 A * | 10/1976 | Kalpins | .................. | E02D 27/34 405/225 |
| 4,113,561 A * | 9/1978 | Fidler | .................... | G21C 15/18 376/299 |
| 5,699,394 A * | 12/1997 | Schreiber | ............... | G21C 11/08 376/289 |
| 8,867,691 B1 * | 10/2014 | Root | ........................ | G21D 1/00 376/277 |
| 9,378,855 B2 | 6/2016 | Ganesan | | |
| 9,396,823 B2 | 7/2016 | Ganesan | | |
| 9,502,143 B2 | 11/2016 | Ganesan | | |
| 2009/0129531 A1 * | 5/2009 | Reyes, Jr. | ............ | G21C 13/022 376/299 |
| 2015/0170773 A1 * | 6/2015 | Ganesan | .................. | G21D 1/00 376/347 |

* cited by examiner

*Primary Examiner* — Sharon M Davis
(74) *Attorney, Agent, or Firm* — Dennis L. Thomte; Thomte Patent Law Office LLC

(57) ABSTRACT

A floating nuclear power reactor is provided and includes a barge floating in a tank filled with water. The reactor includes a self-cooling containment structure and an emergency heat exchange system.

21 Claims, 8 Drawing Sheets

FLOATING NUCLEAR POWER REACTOR WITH A SELF-COOLING CONTAINMENT STRUCTURE AND AN EMERGENCY HEAT EXCHANGE SYSTEM

BACKGROUND OF THE INVENTION

Field of the Invention

This invention relates to a floating nuclear power reactor. More particularly this invention relates to a floating nuclear power reactor including a barge which is floatably positioned in the interior of a large water-filled tank and wherein the nuclear power reactor is positioned on the barge. Even more particularly, the nuclear power reactor of this invention has a containment structure which is self-cooling. Further, this invention relates to an emergency cooling system for the nuclear power reactor. Additionally, the invention relates to a suspension structure for maintaining the barge in a level condition in the water-filled tank. The suspension structure also prevents the barge from coming into contact with the tank and which is movable upwardly and downwardly with respect to the tank.

Description of the Related Art

In most nuclear power reactors, a primary electrically operated water pump supplies cooling water to the reactor. In many cases, a secondary or back-up water pump is provided in case the primary water pump becomes inoperative. However, should the electrical power source for the water pump or water pumps be disrupted such as in a tsunami, a typhoon or an earthquake, the water pumps are not able to pump cooling water to the reactor which may result in a dangerous meltdown. Further, in some situations, the pipes supplying cooling water to the reactor may fail due to natural causes or a terrorist attack.

Currently, there are land based reactor cooling systems available which store water in a tank above the level of the reactor which will passively feed the reactor in case of pump or electricity failure. These tanks are designed to have enough water to cool the system for three days until help can arrive and more water can be pumped in from outside. The problem is that water stored in these tanks is of finite quantity. The tanks will work in case of an emergency shut down like in Fukushima, Japan, but will not work in the case of a pipe breakdown leaking a huge amount of water to the exterior. The reactor core will heat the water supplied from the tank and steam will escape via the pipe breakdown and the water will run out. Once the water runs out, the reactor core will melt due to overheating and explode. It is therefore necessary to be able to supply an infinite amount of water to compensate for lost water via a leaking pipe.

Further, current day reactors are protected by huge containment structures but this is not the answer to pipe breakdown outside or inside the containment chambers. A terrorist attack on the turbine room outside the containment structure is probably more dangerous than an attack on the containment structure since such an attack would result in multiple pipes breaking down, thereby breaking the water circuit between the reactor, turbine and condenser. Such an attack could also result in a breakdown of electrical control systems. This would result in the loss of circulating water to the reactor with the emergency stored water being unable to compensate for all the leaking pipes. In such a situation, the reactor will overheat without heat removal and explode.

Applicant has previously received U.S. Pat. Nos. 9,378,855; 9,396,823; and 9,502,143 relating to floating nuclear power reactors. The above-identified patents represent a significant advance in the art and the instant invention represents a further improvements in the art in more than one way.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear reactor is disclosed. The floating nuclear reactor of this invention includes a generally rectangular tank having a bottom wall, an upstanding first end wall, an upstanding second end wall, an upstanding first side wall and an upstanding second side wall. The tank may have other shapes than rectangular. Each of the first end wall, the second end wall, the first side wall and the second side wall of the tank have an outer side, an inner side, a lower end and an upper end. The tank is buried in the ground with the tank having water therein. The upper end of the tank will be at ground level or above ground level.

A barge is floatably positioned in the tank with the barge having a bottom wall, a first end wall, a first side wall, a second side wall and an open second end.

A nuclear reactor is positioned in the barge. The nuclear reactor includes a first containment member which preferably has a cylindrical body section, an upper section and a lower section. The first containment member is comprised of stainless steel or other suitable material. The first containment member is positioned at the open end of the barge with the sides of the first containment member being in engagement with the ends of the sidewalls of the barge so as to close the open end of the barge. The positioning of the first containment member causes a portion of the outer side of the first containment member to be in contact with the water in the tank to cool the first containment member. The first containment member defines a sealed interior compartment. A reactor vessel is positioned in the interior compartment of the first containment member to define an air compartment between the outer side of the reactor vessel and the inner side of the first containment member. The reactor vessel is supported within the first containment member by a plurality of braces. The reactor vessel may be centrally positioned within the first containment member or laterally off-set from the central axis of the first containment member.

The first containment member has a hatch or door mounted thereon at the lower end thereof which selectively closes a lower opening in the first containment member. The lower opening in the first containment member is in fluid communication with the water in the tank when the hatch or door is opened so that the air compartment may be flooded. The first containment member may also have a lower water pipe extending from the lower end thereof which is in fluid communication with the air compartment. A normally closed one-way valve is imposed in the lower pipe. The outer end of the lower pipe is in fluid communication with the water in the tank. When the one-way valve in the water pipe is in a closed position, fluid in the air compartment may not flow outwardly through the water pipe. When the one-way valve in the water pipe is open, water from the tank may pass upwardly through the water pipe to flood the air compartment.

The reactor vessel is positioned in the interior compartment of the first containment member and is supported therein by braces which extend between the exterior of the reactor vessel and the interior sides of the first containment member. In one embodiment, the reactor vessel is centrally positioned within the first containment member. In a second embodiment, the reactor vessel is offset from the central axis of the first containment member. The reactor vessel has an interior compartment which is filled with a fluid.

The upper section of the reactor vessel has an upper pipe or tube extending upwardly therefrom which is in fluid communication with the interior compartment of the reactor vessel. An optional first valve is imposed in the upper pipe which extends upwardly from the reactor vessel. The first valve is an electric open-close valve which is normally closed but which opens if electrical power thereto is disrupted. A plurality of spaced-apart cooling tubes are fluidly connected to the upper tube and extend downwardly therefrom between the first containment member and the reactor vessel in the air compartment. The lower ends of the cooling tubes are fluidly connected to a lower pipe or tube which extends downwardly from the reactor vessel. An optional second valve is imposed in the lower tube. The optional second valve is an electric open-close valve which is normally closed but which opens if electrical power thereto is disrupted. A normally closed and optional one-way third valve is imposed in the upper tube downstream from the optional first valve. The optional third valve, when closed, prevents water in the cooling tube from flowing inwardly to the upper section of the reactor vessel. A normally closed and optional one-way fourth valve is imposed in the lower tube upstream of the optional second valve. The optional fourth valve, when closed, prevents water in the reactor vessel from flowing outwardly therefrom.

A heat exchanger is positioned adjacent the first containment member and includes a body section, an upper section and a lower section. The configuration of the heat exchanger may take many shapes. The heat exchanger includes an outer wall member or second containment member which is comprised of metal. A vessel is positioned within the second containment member of the heat exchanger and is supported therein by braces. The vessel has an interior compartment which is filled with fluid.

A first tube section is in fluid communication with the interior compartment of the reactor vessel and extends outwardly therefrom and extends through the first containment member, through the second containment member of the heat exchanger and then through the vessel of the heat exchanger and into the interior compartment thereof. A second tube section extends from the first tube section in the interior compartment. A third tube section extends from the second tube section, through the wall of the vessel of the heat exchanger, through the outer wall of the heat exchanger, and through the containment member and through the wall of the reactor vessel so as to be in fluid communication with the interior compartment of the reactor vessel. A fourth tube section extends from the interior compartment of the heat exchanger to a turbine. A return line or tube extends from the discharge side of the turbine to the interior compartment of the heat exchanger. The turbine drives a generator in conventional fashion with the generator having power lines extending therefrom in conventional fashion.

When the nuclear power reactor is functioning in a conventional manner, the optional first, second, third and fourth valves if used will be closed. If the first, second, third and fourth valves are not used, there will be no fluid circulation through the cooling tube assembly. The heated fluid or steam created in the interior compartment of the reactor vessel will be discharged into the heat exchanger vessel by way of an upper tube section. As the heated fluid or steam passes through the upper tube section, the intermediate tube section and the lower tube section, the fluid in the interior compartment of the heat exchanger vessel will be heated. The heated fluid and/or steam in the interior compartment of the heat exchanger vessel will be discharged to a turbine to drive the turbine and a generator driven by the turbine. A fluid and/or steam return line extends from the discharge side of the turbine to the interior compartment of the heat exchanger vessel.

If the nuclear reactor becomes over heated or over pressurized, the hatch at the lower end of the first containment member will be opened to flood the air compartment of the reactor vessel to cool the same as well as the cooling tube assembly. The first valve, the second valve, the third valve and the fourth valve, if used, will be opened to permit the hot fluid and/or steam from the interior compartment of the reactor vessel to pass through the cooling tubes, which are in contact with the water in the air compartment to cool the fluid and/or steam in the cooling tubes.

A plurality of suspension assemblies interconnect the barge to the tank to maintain the barge in a level condition. The suspension assemblies also permit the barge to move downwardly and upwardly in the tank in the event of an aircraft strike, a missile strike or an earthquake. The suspension assemblies also prevent the barge from coming into contact with the tank.

A principal object of the invention is to provide an improved floating nuclear power reactor.

A further object of the invention is to provide a floating nuclear power reactor having an emergency heat exchange system.

A further object of the invention is to provide a floating nuclear power reactor wherein the nuclear reactor is positioned on a barge which floats in the water of a tank or in a body of water.

A further object of the invention is to provide a nuclear power reactor which is mounted on a barge floating in a tank with suspension assemblies being provided to maintain the barge and the nuclear reactor in a level condition and to permit the barge to move upwardly and downwardly in the tank.

A further object of the invention is to provide a floating nuclear power reactor wherein a portion of the containment is in contact with the water in a tank.

A further object of the invention is to provide a floating nuclear power reactor having a unique cooling tube assembly associated therewith.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U. S. Pat. Nos. 9,378, 855; 9,396,823; and 9,502,143 relating to floating nuclear power reactors. Applicant incorporates the disclosure of the above identified patents in their entirety by reference thereto to complete this disclosure if necessary. As used herein, the term fluid may include steam.

Figure 1:
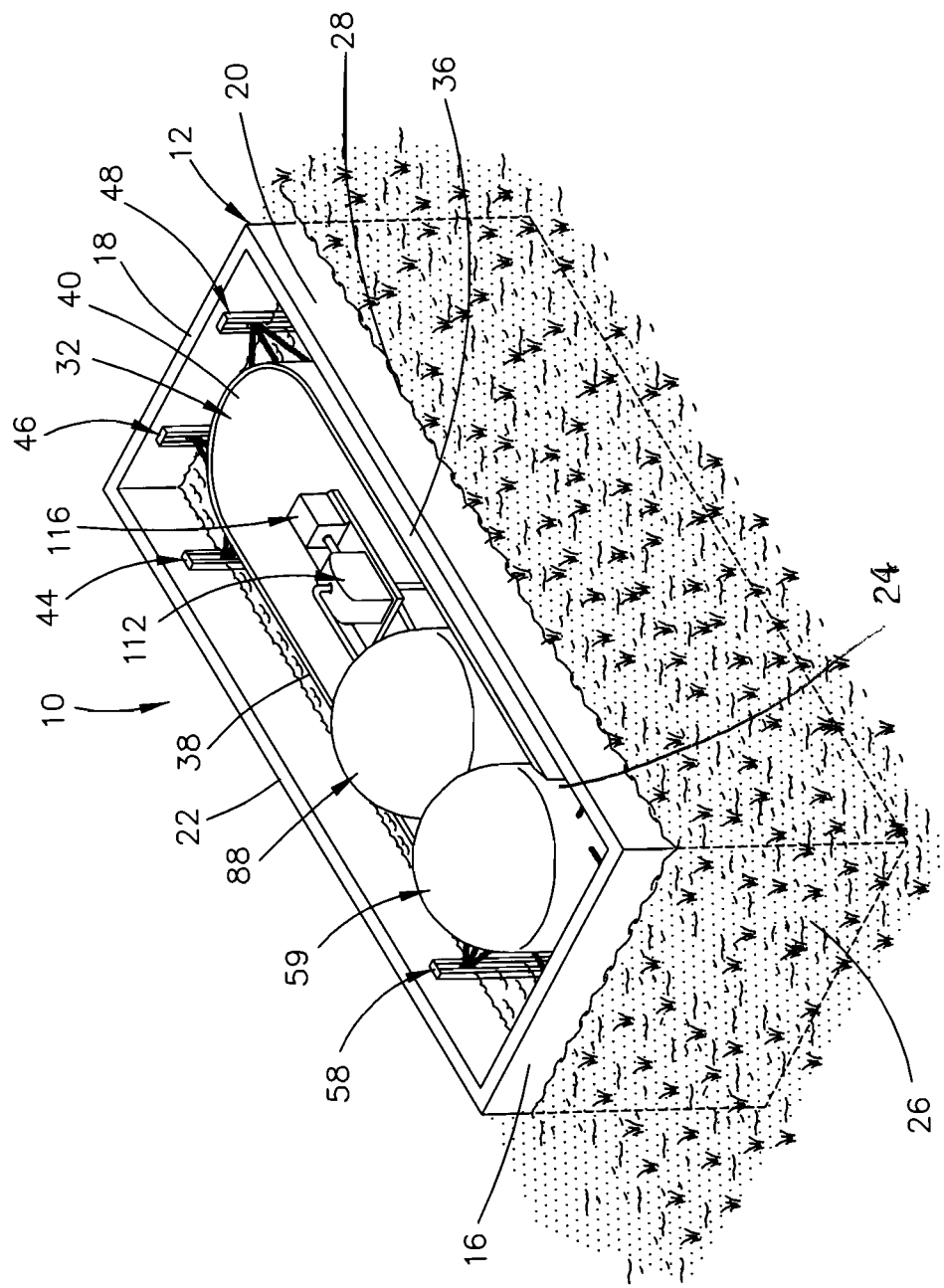
FIG. 1 is a perspective view illustrating the floating nuclear power reactor of this invention floating in a tank filled with water.

The floating nuclear reactor of this invention is referred to generally by the reference numeral 10. The nuclear reactor 10 floats in a concrete tank 12 having a bottom wall 14, a first end wall 16, a second end wall 18, a first side wall 20, a second side wall 22 and an open upper end 24. Tank 12 is buried in the ground 26 as seen in FIG. 1 so that the upper end 24 of tank 12 is at or above ground level 28. The tank 12 is partially filled with water 30 from a source of water. Tank 12 could also be a body of water. Preferably the water 30 is gravity fed to the tank 12.

The numeral 32 refers to a barge-like vessel (hereinafter "barge") which floats in the tank 12. Barge 32 includes a bottom wall 34, a first side wall 36, a second side wall 38, a semi-circular end wall 40 and an open end 41 at the ends 42 and 43 of side walls 36 and 38 respectively. Barge 32 is comprised of a metal material such as stainless steel, steel, iron, aluminum or other suitable material. Barge 32 is supported in tank 12 by a plurality of upper suspension assemblies 44, 46, 48, 50, 52, 54, 56 and 58 which extend between the barge 32 and the tank 12 as will be described in detail hereinafter. Barge 32 is also supported in tank 12 by eight lower suspension assemblies, identical to suspension assemblies 44, 46, 48, 50, 52, 54, 56 and 58, which are positioned below suspension assemblies 44, 46, 48, 50, 52, 54, 56 and 58.

The numeral 59 refers to a nuclear reactor which is positioned in barge 32 so as to close the open end 41 of barge as will be explained in detail hereinafter. Reactor 59 includes an upstanding containment member 60 which has a cylindrical body portion 62, an upper section 64 and a lower section 66. Containment member 60 is comprised of stainless steel or other suitable material. Containment member 60 is positioned at the open end 41 of barge 32 with the sides of containment member 60 being in engagement with the ends 42 and 43 of side walls 36 and 38 respectively of barge 32 and being secured thereto by welding or the like to close the open end 41 of barge 32. The positioning of the containment member 60 as just described causes a portion of the outer side of containment member 60 to be in contact with the water 30 in tank 12 to cool the containment member 60. Containment member 60 defines a sealed interior compartment 68.

Figure 2:
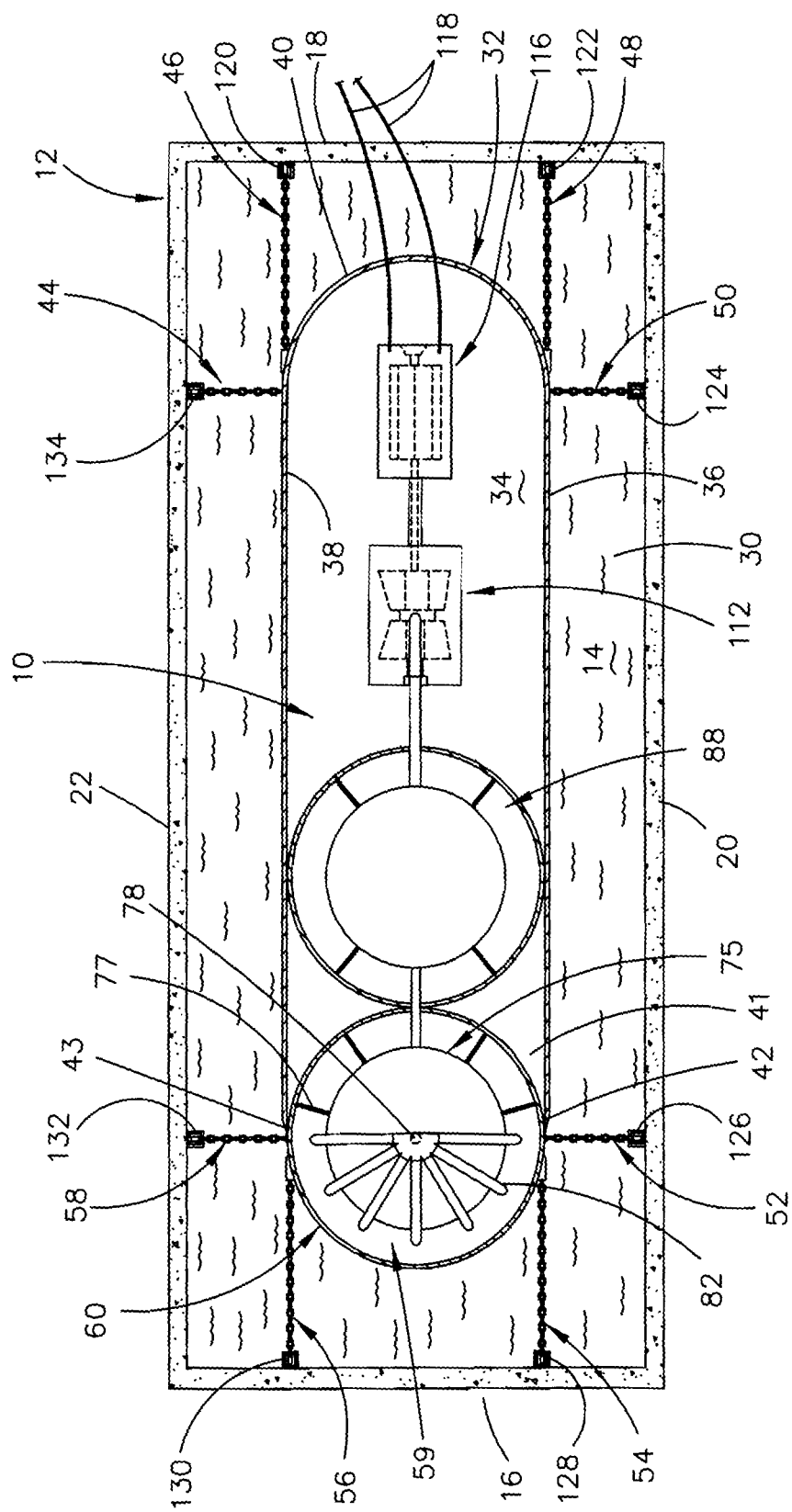
FIG. 2 is a partial sectional view as viewed from the top of the floating nuclear power reactor of this invention.

Containment member 60 has a hatch 70 mounted therein as seen in FIG. 2 which closes an opening 71 in containment member 60. Containment member 60 may also have a pipe 72 extending from the lower end thereof which is in fluid communication with the air compartment 68. A normally closed one-way valve 74 is imposed in pipe 72. In some cases, the opening 71 and hatch or gate 70 may not be necessary.

Figure 2A:
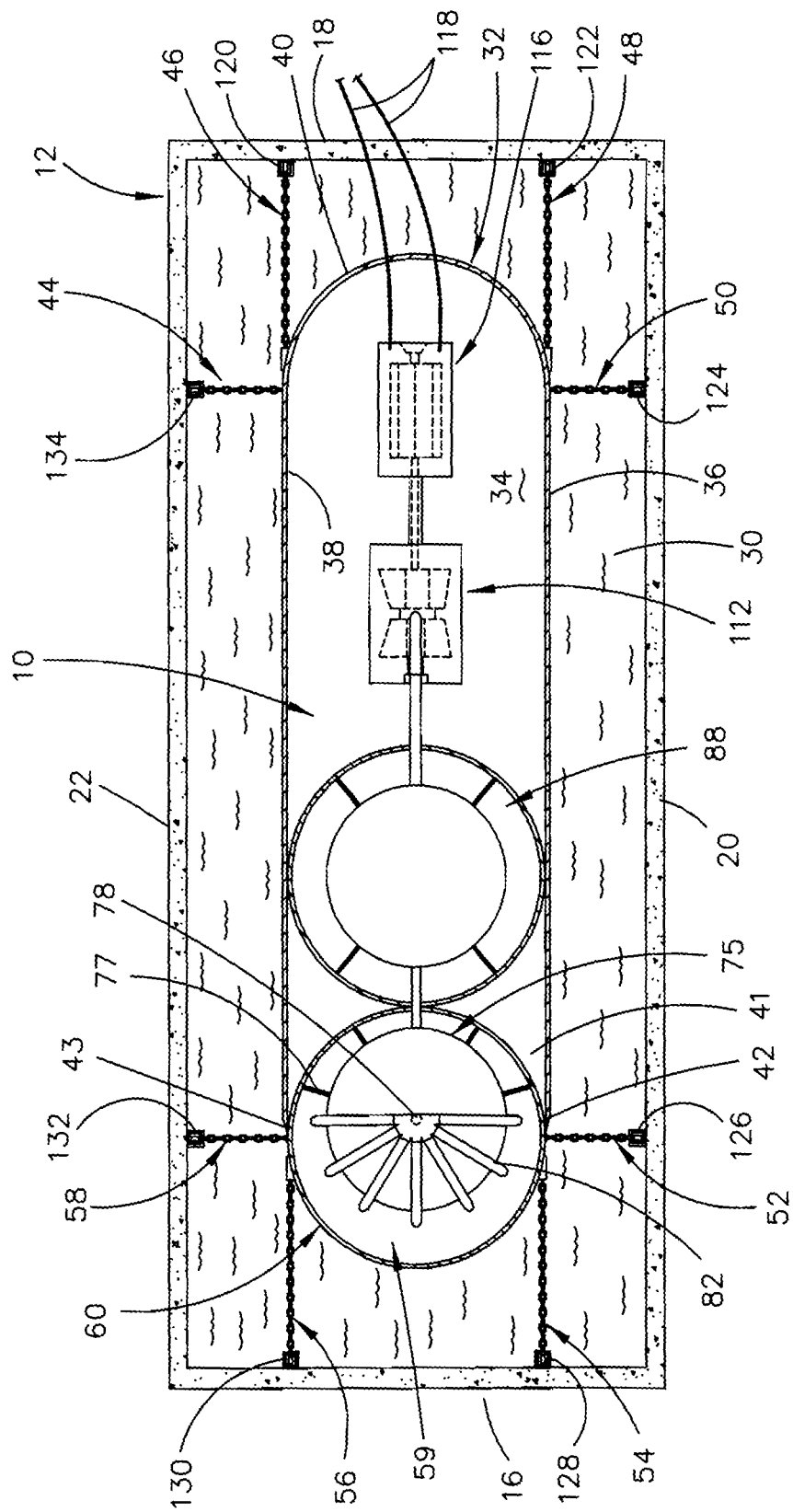
FIG. 2A is a view similar to FIG. 2 except that the nuclear reactor vessel of FIG. 2 has been moved closer to the metal containment structure.

A reactor vessel 75 is positioned in compartment 68 and has an interior compartment 76. Vessel 75 is supported in compartment 68 by braces 77 which extend between the exterior of reactor vessel 75 and the interior side of containment member 60 as seen in FIG. 2. As seen in FIG. 2, the reactor vessel 75 is centrally positioned within containment member 60. FIG. 2A is identical to FIG. 2 except for the fact that the reactor vessel 75 is positioned closer to one side of the containment member 60. As seen in FIG. 2A, the positioning of the reactor vessel 75 closer to the heat exchanger shortens the tube sections extending therebetween thereby reducing the chance of pipe or tube break down in the circuit.

The upper section of reactor vessel 75 has a pipe or tube 78 extending therefrom which is in fluid communication with the interior compartment 76. An open and close electric valve 80 is imposed in tube 78. A normally closed one-way valve 81 is imposed in tube 78 downstream of valve 80. A plurality of tubes 82 are fluidly connected to tube 78 and extend downwardly therefrom between containment member 60 and reactor vessel 75. The lower ends of tubes 82 are fluidly connected to a pipe or tube 84 which extends downwardly from reactor vessel 75, the inner end of which is in fluid communication with interior compartment 76. An open and close valve electric 86 is imposed in tube 84. A normally closed one-way valve 87 is imposed in tube 84 upstream of valve 86. The valves 80 and 86 are electric valves and are normally closed. Should electrical power be disrupted, the valves 80 and 86 move to their open positions to permit hot fluid and/or steam to pass therethrough. The open valve 80 permits fluid and/or steam to pass therethrough towards the lower end of tubes 82. The open valve 86 permits the fluid and/or steam to pass upwardly into the interior compartment 76 of vessel 75. Valves 80 and 86 separate the tube loop from the reactor vessel during the time the reactor is functioning. In case of electricity failure or any other reason for emergency shut down, valves 80 and 86 open to allow the hot liquid in the reactor vessel 75 to move into the cooling loop. When the valves 80 and 86 are open, any upward movement of the liquid in the tubes 82 would be prevented by the one-way valves 87 and 81.

The valves 80, 81, 86 and 87 are optional. If the valves 80, 81, 86 and 87 are not used, there will be no fluid circulation in the cooling tube assembly until the air compartment 68 is flooded.

The numeral 88 refers to an upstanding heat exchanger which is positioned adjacent containment member 60 as seen in the drawings. Heat exchanger 88 includes a central body portion 90, an upper section 92 and a lower section 94. Heat exchanger 88 includes an outer wall member 96 which is comprised of a metal material such as stainless steel or other suitable material. A vessel 98 is positioned within heat exchanger 88 and is supported therein by braces 100 extending therebetween. Wall member 96 and vessel 98 define an interior compartment 99. Vessel 98 has an interior compartment 101.

Figure 3:
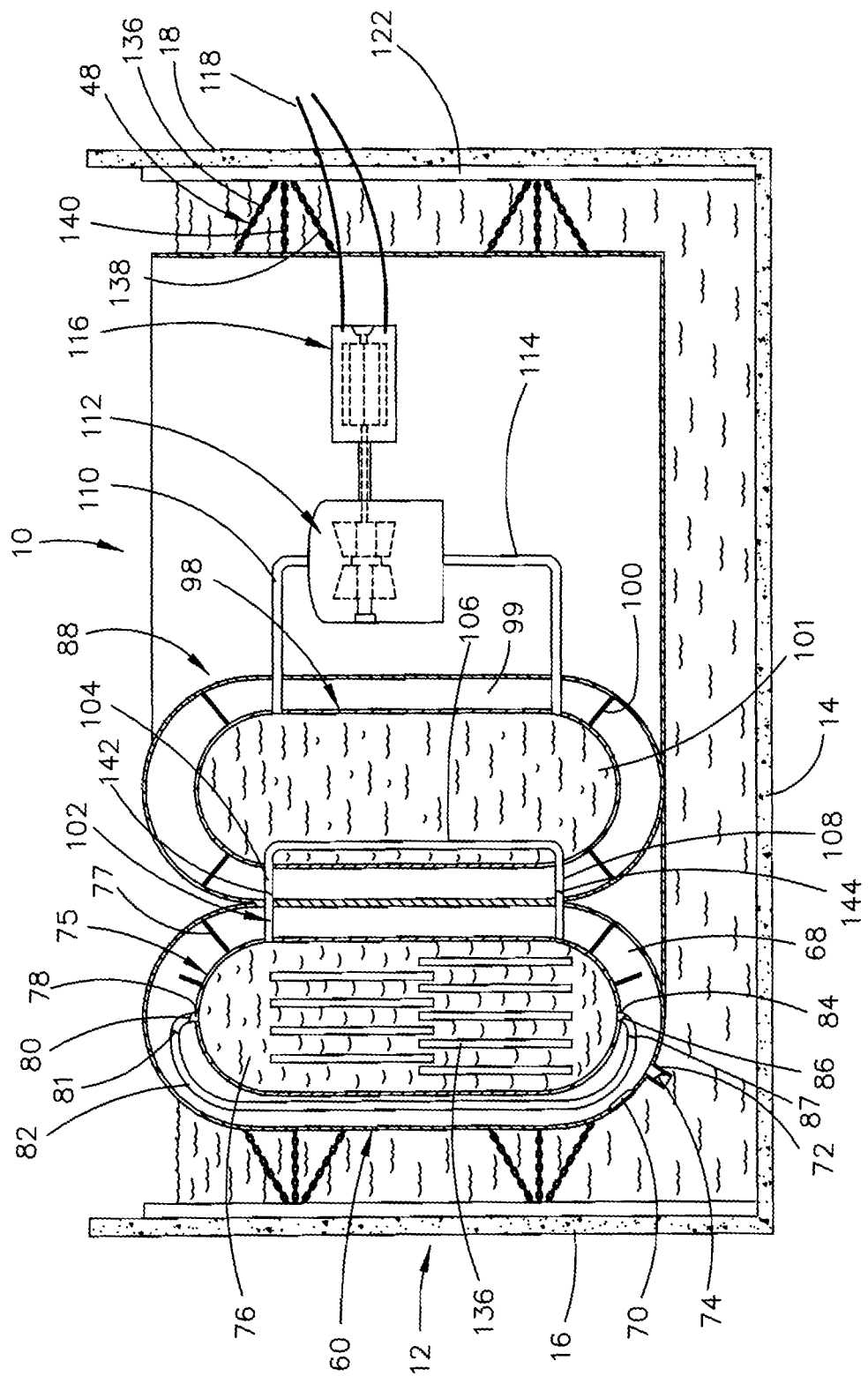
FIG. 3 is a sectional view of the floating nuclear power reactor of this invention.
Figure 3A:
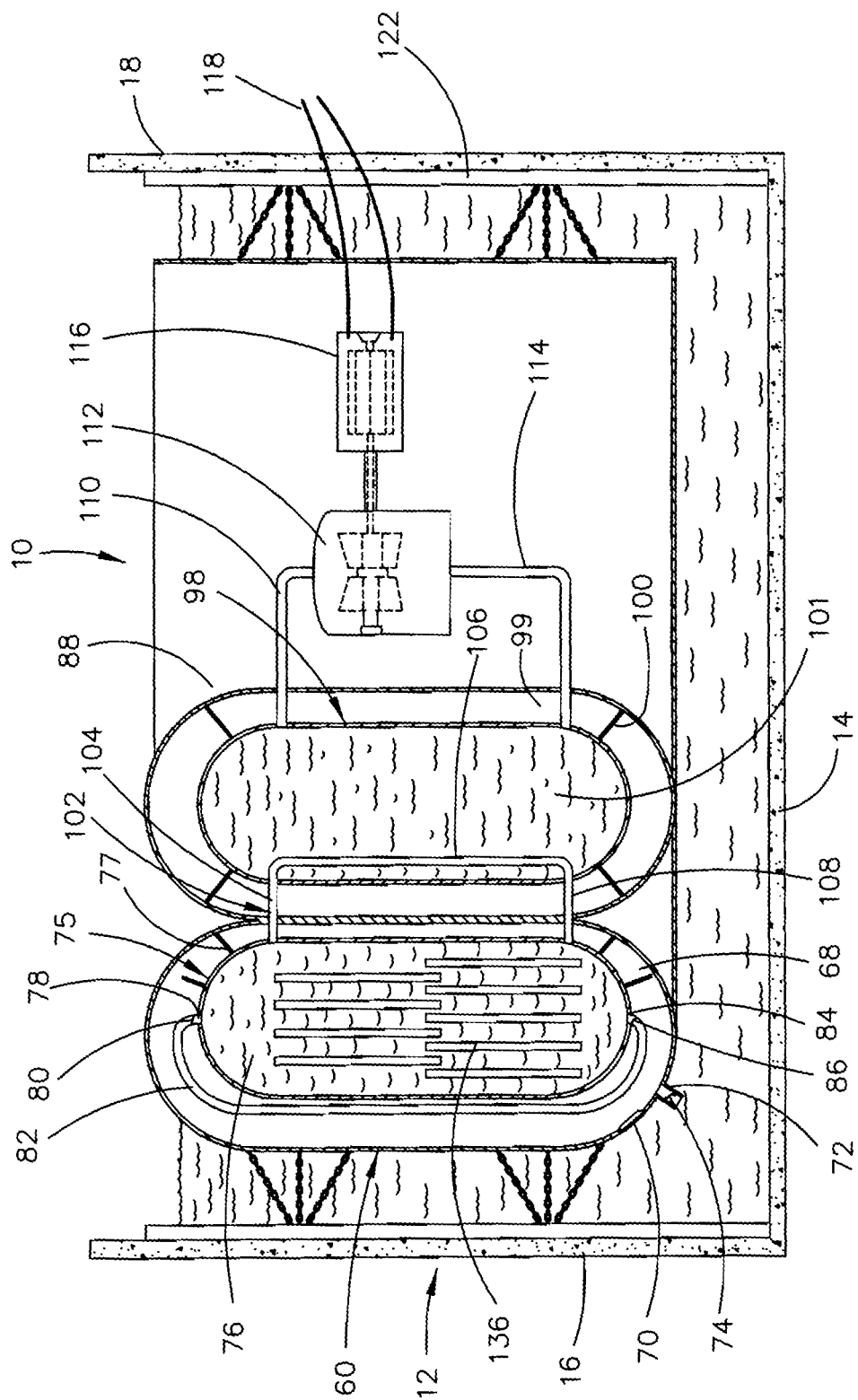
FIG. 3A is a view similar to FIG. 3 except that the reactor vessel has been moved closer to one side of the metal containment member.
Figure 4:
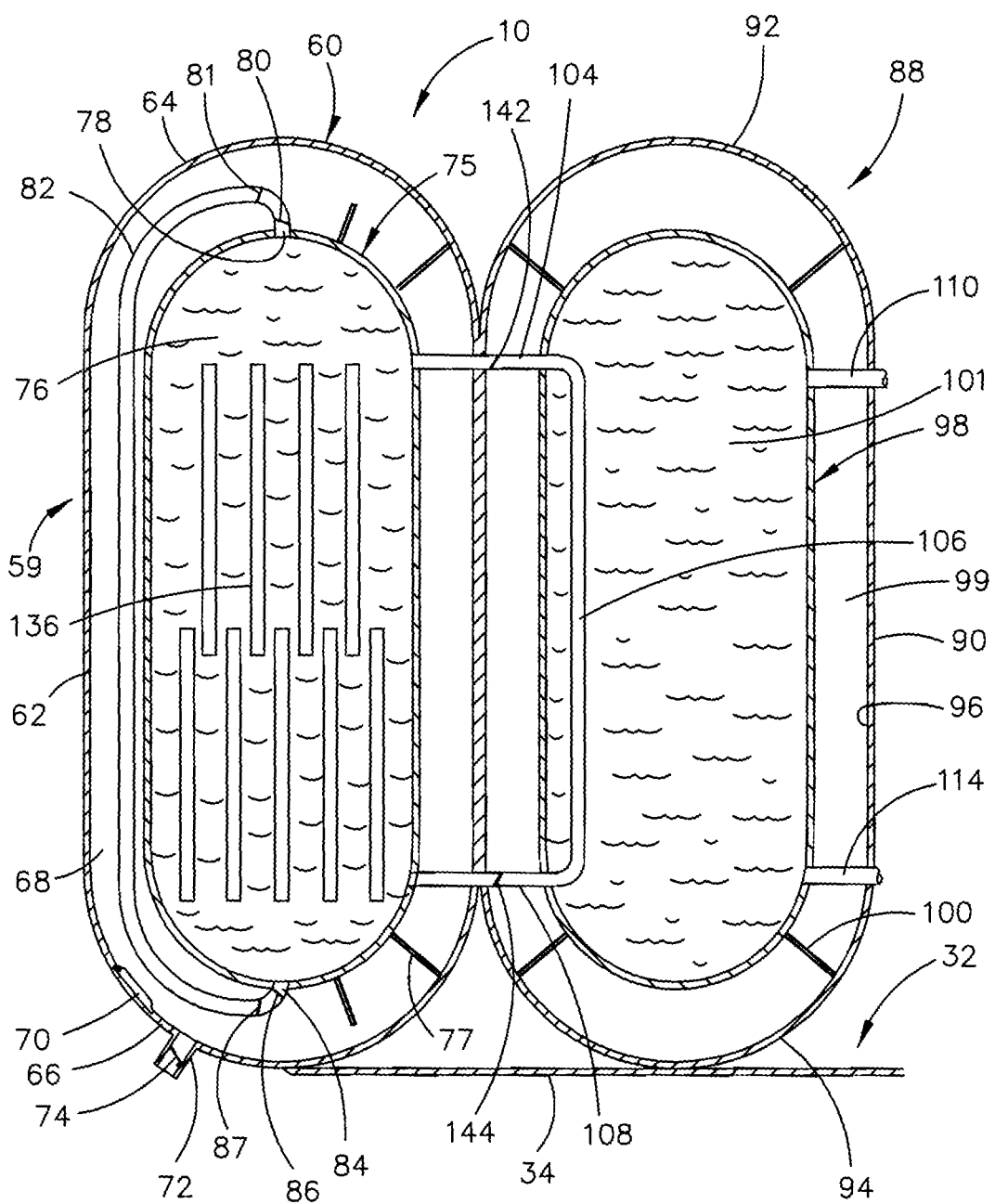
FIG. 4 is a sectional view of a portion of the floating nuclear power reactor of this invention.

The numeral 102 refers to a tube having tube sections 104, 106 and 108. Tube section 104 is in fluid communication with the reactor vessel 75 and extends outwardly therefrom and extends through containment member 60, through outer wall member 96 of heat exchanger 88 and thence through vessel 98 into compartment 101. An electric open close valve 142 is imposed in tube section 104 and is normally open. Valve 142 will close if electric power is interrupted or if there is pipe breakage outside of containment member 60. Tube section 106 extends from tube section 104 in the interior compartment 101 as seen in FIG. 3. An electric open close valve 144 is imposed in tube section 108 and is normally open. Valve 144 will close if electric power is interrupted or if there is pipe breakage outside of containment member 60. Tube section 108 extends from tube section 106, through the wall of vessel 98, through the outer wall 96 of heat exchanger 88, through containment member 60 and through the wall of reactor vessel 75 so as to be in fluid communication with the interior compartment 76 of reactor vessel 75.

Tube 110 extends from the interior compartment 101 of heat exchanger 88 to a turbine 112. A return line or tube 114 extends from the discharge side of turbine 112 to the interior compartment 101 of heat exchanger 88. Turbine 112 drives a generator 116 in conventional fashion with the generator 116 having power lines 118 extending therefrom in conventional fashion.

A pair of vertically disposed guide tracks or channels 120 and 122 are secured to the inner side of end wall 18. A pair of vertically disposed guide tracks or channels 124 and 126 are secured to the inner side of side wall 20. A pair of vertically disposed guide tracks or channels 128 and 130 are secured to the inner side of end wall 16. A pair of vertically disposed guide tracks or channels 132 and 134 are secured to the inner side of side wall 22. Each of the guide tracks 120, 122, 124, 126, 128, 130, 132 and 134 have an upper wheel and a lower wheel vertically movable therein.

In as much as the suspension assemblies 44, 46, 48, 50, 52, 54, 56 and 58 are identical except for length, only suspension assembly 48 will be described in detail. Suspension assembly 48 includes an upper chain member 136, a lower chain member 138 and an intermediate chain member 140. The outer ends of chain members 136, 138 and 140 are secured to the upper wheel in guide track 122. The inner ends of chain members 136, 138 and 140 are secured to the barge 32. As seen, upper chain member 136 extends upwardly and inwardly from guide track 122 to barge 32. As also seen, lower chain member 138 extends downwardly and inwardly from guide track 122 to barge 32. Further, as seen, intermediate chain member 140 extends horizontally inwardly from guide track 122 to barge 32. The suspension assembly below suspension assembly 46 would be similarly attached to the lower wheel in guide track 122 and the barge 32. The other suspension assemblies would be attached to the guide tracks 124, 126, 128, 130, 132 and 134 and the barge 32.

The suspension assemblies 44, 50, 56 and 58 are identical. The suspension assemblies 46, 48, 54 and 56 are identical. The only difference between the suspension assemblies 44, 50, 56, 58 and the suspension assemblies 46, 48, 54 and 56 is that the suspension assemblies 46, 48, 54 and 56 are somewhat longer than the suspension assemblies 44, 50, 56 and 58.

Figure 6:
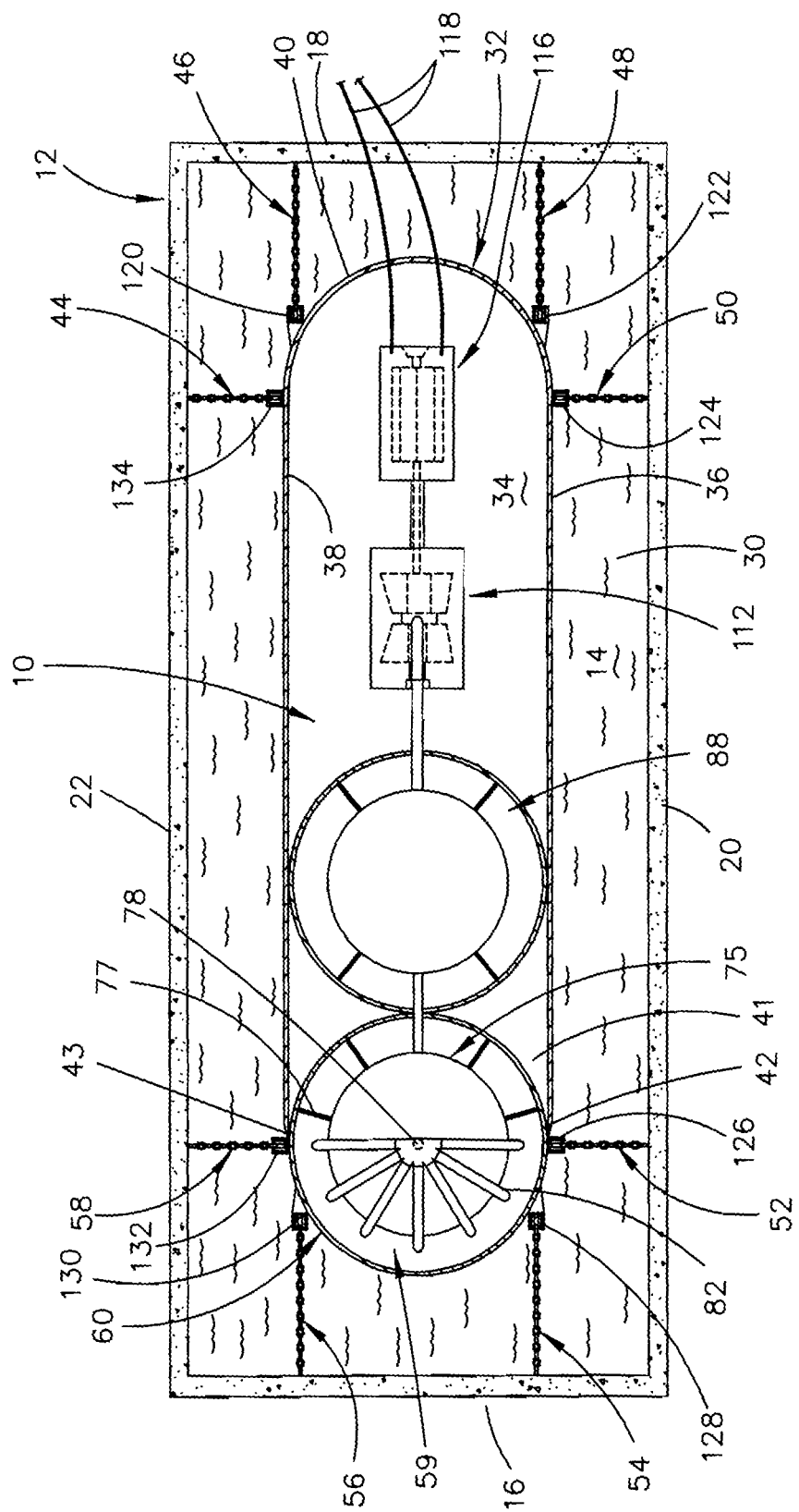
FIG. 6 is a view similar to FIG. 2 except that the guide tracks of the suspension assemblies are secured to the barge rather than the tank and the chains of the suspension assemblies are secured to the tank.

FIG. 6 illustrates an optional configuration wherein the guide tracks 120, 122, 124, 126, 128, 130, 132 and 134 are mounted on the barge 32 rather than the inner sides of the tank 12. In that situation, the chains thereof are secured to the inner sides of the tank 12.

The suspension assemblies not only maintain the barge 32 in a level position but permit the barge 32 to move upwardly and downwardly in the tank 12. Further, the suspension assemblies prevent the barge 32 from moving into contact with the tank 12.

Although it is preferred that each of the suspension assemblies include an intermediate chain member 140, there are some instances where the intermediate chain member 140 is not needed.

In normal operating conditions, the water or other liquid within compartment 76 of reactor vessel 75 is heated in conventional fashion by the rods 136. Normally, if used, valves 80 and 81 in tube 78 will be in their closed position and valves 86 and 87 in tube 84 will be closed. Further, valve 74 in pipe 72 will be closed. Additionally, hatch 70 will be closed. During normal operating conditions, the hot fluids and/or steam caused by the heating of the liquid in compartment 76 of reactor vessel 75 by the rods 136 will pass outwardly from the interior compartment 76 by way of tube section 104 of tube 102. Tube section 104 extends outwardly through containment member 60, through the wall member 96 of heat exchanger 88 and through outer wall of vessel 98 into the interior compartment 101 in heat exchanger 88. Then as the hot liquid or steam passes through the interior compartment 101, the heat from the tube sections 104, 106 and 108 will heat the fluid in compartment 101. The heated fluid or steam in compartment 101 is fed to the turbine 112 by way of the tube 110. The heated fluid or steam in the turbine 112 will cause it to rotate and drive generator 116 so that the electricity generated by the generator will be fed to the electrical wires 118. The return line 114 returns the steam or hot fluid to compartment 101 to be again heated. In normal operating conditions, the fact that the outer side of the containment member 60 is in contact with the cool water 30 in tank 12, reduces the heat of the containment member 60.

Figure 5:
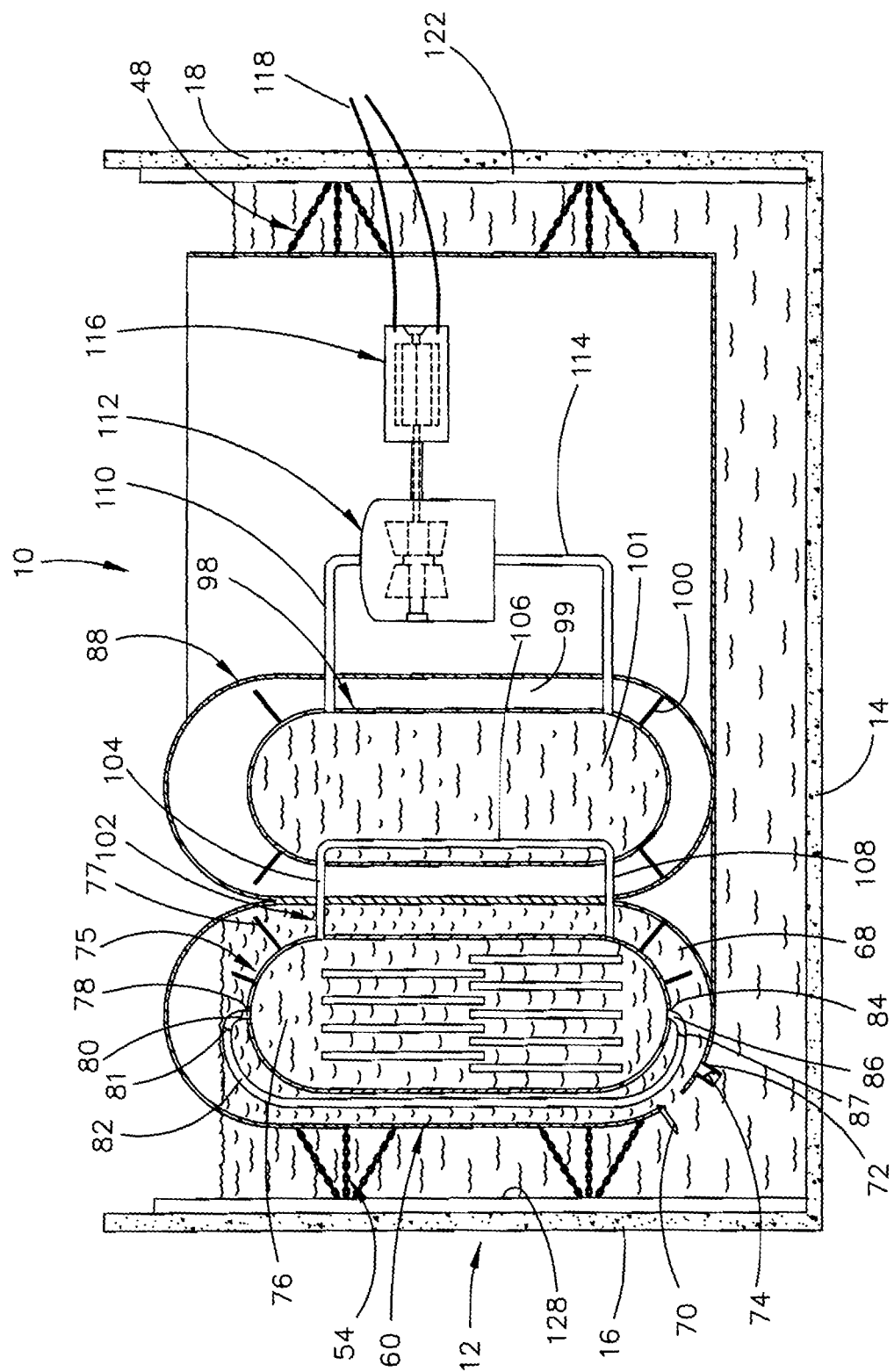
FIG. 5 is a sectional view similar to FIG. 3 except that the containment structure has been flooded with emergency cooling water.

If the reactor 59 becomes over heated or over pressurized, the valve 74 and/or the hatch 70 will open to permit the cool water 30 in the tank 12 to enter and at least partially fill or flood the air compartment 68 as seen in FIG. 5. The water in compartment 68 will surround reactor vessel 75 to cool the reactor vessel 75. Additionally, the optional valves 80 and 81 in pipe 78 will be opened and the optional valves 86 and 87 in pipe 84 will be opened so that the hot fluid in reactor vessel 75 will flow into the tube 82 and pass downwardly in the tubes 82. The tubes 82 are surrounded by the cool water in air compartment 68 and will cool the hot fluid or steam therein. As the hot fluid in tubes 82 is cooled, the density of the fluid in the tubes 82 increases to induce downward movement of the fluid in tubes 82. The cooled fluid or steam in the tubes 82 is returned to the compartment 76 to cool the reactor. The valves 81 and 87 are preferred but are optional as stated. The valve 74 and pipe 72 are also optional as stated.

In summary, when the nuclear reactor is functioning properly, the engagement of the outer side of the containment member 60 with the water in tank 12 will cool the containment member 60. At that time, the optional valves 80, 81, 86 and 87 will be closed. At that time, valve 81 will prevent fluid flow therethrough as will valve 80. At that time, valves 86 and 87 will prevent flow therethrough. Should power be interrupted, valves 80 and 86 will be opened. Fluid from the interior of reactor vessel 75 may pass through valves 80 and 86. Valves 81 and 87 prevent any backflow therethrough. This results in hot fluid, moving from upper section of interior compartment 76, passing through tube sections 78, 82 and 84 to lower section of interior compartment 76. The water in air compartment 68 cooling the fluid within reactor vessel 75 by way of the tubes 82 will prevent the reactor from overheating.

The suspension assemblies described above maintain the barge 32 in a level position during high winds or storms. The suspension assemblies not only maintain the barge 32 in a level manner during high winds or storms, but also permits the barge 32 to move downwardly in tank 12 to absorb some of the impact should the barge 32 and the equipment thereon be struck by a missile or aircraft.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A floating nuclear reactor, comprising:
    a tank having water therein which includes;
        (a) a horizontally disposed bottom wall having a first end, a second end, a first side and a second side;
        (b) a vertically disposed first end wall, having a first side, a second side, a lower end and an upper end, extending upwardly from said first end of said bottom wall;
        (c) a vertically disposed second end wall, having a first side, a second side, a lower end and an upper end, extending upwardly from said second end of said bottom wall;
        (d) a vertically disposed first side wall, having a first end, a second end, a lower end and an upper end, extending between said first ends of said first and second end walls;
        (e) a vertically disposed second side wall, having a first end, a second end, a lower end and an upper end, extending between said second ends of said first and second end walls;
    each of said first end wall, said second end wall, said first side wall and said second side wall of said tank having inner and outer sides;
    said tank being buried in the ground whereby said upper ends of said first end wall, said second end wall, said first side wall and said second side wall of said tank are positioned at ground level or above ground level;
    a barge, having a first end, a second end, a first side and a second side, floatably positioned in said tank;
    said barge including:
        (a) an upstanding first end wall having an upper end, a lower end, a first side, a second side, an inner side and an outer side;
        (b) an upstanding first side wall having an upper end, a lower end, a first end, a second end, an inner side and an outer side;
        (c) said first end of first side wall of said barge being joined to said second end of said first end wall of said barge and extending therefrom;
        (d) an upstanding second side wall having an upper end, a lower end, a first end, a second end, an inner side and an outer side;
        (e) said first end of said second side wall of said barge being joined to said first end of said first end wall of said barge and extending therefrom;
        (f) a horizontally disposed bottom wall having a first end, a second end, a first side and a second side;
        (g) said bottom wall extending between said lower ends of said first end wall, said first side wall and said second side wall of said barge;
        (h) said barge having an open end at said second ends of said first side wall, said second side wall and said second end of said bottom wall;
    an upstanding nuclear reactor positioned on said barge at said second end of said barge;
    said nuclear reactor including an upstanding first containment member having a central section, an upper section, a lower section, and an interior compartment;
    said first containment member being secured to said second ends of said first and second side walls of said barge and to said second end of said bottom wall of said barge to close said open end of said barge;
    said first containment member having an outer portion thereof which is in contact with the water in said tank; and
    an upstanding nuclear reactor vessel, having an upper section and a lower section, positioned within said interior compartment of said first containment member.

2. The floating nuclear reactor of claim 1 wherein said nuclear reactor vessel is centrally positioned in said interior compartment of said first containment member.

3. The floating nuclear reactor of claim 1 wherein said nuclear reactor vessel is laterally offset with respect to said interior compartment of said first containment member.

4. The floating nuclear reactor of claim 1 wherein said nuclear reactor vessel is suspended within said interior compartment of said first containment member by a plurality of braces secured to said first containment member and said nuclear reactor vessel and which extend therebetween.

5. The floating nuclear reactor of claim 1 wherein said first containment member has a first water inlet formed therein and which is selectively closed by a gate member whereby water in said tank will flood said interior compartment of said first containment member between said first containment member and said nuclear reactor vessel when said gate member is open.

6. The floating nuclear reactor of claim 5 further including a second water inlet opening is formed in said first containment member and wherein a water pipe is in fluid communication with said second water inlet opening and the water in said tank and wherein a normally closed one-way valve is positioned in said water pipe with said one-way valve in said water pipe being configured to flood said interior compartment of said first containment member between said first containment member and said nuclear reactor vessel when in an open position.

7. The floating nuclear reactor of claim 1 wherein said first containment member has a first inlet opening formed therein and wherein a water pipe is in fluid communication with said first water inlet opening and the water in the tank and wherein a normally closed one-way valve is positioned in said water pipe with said one-way valve in said water pipe being configured to flood said interior compartment of said first containment member between said first containment member and said nuclear reactor vessel when in said open position.

8. A floating nuclear reactor, comprising:
a tank having water therein which includes;
   (a) a horizontally disposed bottom wall having a first end, a second end, a first side and a second side;
   (b) a vertically disposed first end wall, having a first side, a second side, a lower end and an upper end, extending upwardly from said first end of said bottom wall;
   (c) a vertically disposed second end wall, having a first side, a second side, a lower end and an upper end, extending upwardly from said second end of said bottom wall;
   (d) a vertically disposed first side wall, having a first end, a second end, a lower end and an upper end, extending between said first ends of said first and second end walls;
   (e) a vertically disposed second side wall, having a first end, a second end, a lower end and an upper end, extending between said second ends of said first and second end walls;
each of said first end wall, said second end wall, said first side wall and said second side wall of said tank having inner and outer sides;
said tank being buried in the ground whereby said upper ends of Said first end wall, said second end wall, said first side wall and said second side wall of said tank are positioned at or above ground level;
a barge, having a first end, a second end, a first side and a second side, floatably positioned in said tank;
said barge including:
   (a) an upstanding first end wall having an upper end, a lower end, a first side, a second side, an inner side and an outer side;
   (b) an upstanding first side wall having an upper end, a lower end, a first end, a second end, an inner side and an outer side;
   (c) said first end of first side wall of said barge being joined to said second end of said first end wall of said barge and extending therefrom;
   (d) an upstanding second side wall having an upper end, a lower end, a first end, a second end, an inner side and an outer side;
   (e) said first end of said second side wall of said barge being joined to said first end of said first end wall of said barge and extending therefrom;
   (f) a horizontally disposed bottom wall having a first end, a second end, a first side and a second side;
   (g) said bottom wall extending between said lower ends of said first end wall, said first side wall and said second side wall of said barge;
   (h) said barge having an open end at said second ends of said first side wall, said second side wall and said second end of said bottom wall;

an upstanding nuclear reactor positioned on said barge at said second end of said barge;
said nuclear reactor including an upstanding first containment member having a central section, an upper section, a lower section, and an interior compartment;
said first containment member being secured to said second ends of said first and second side walls and to said second end of said bottom wall of said barge to close said open end of said barge;
said first containment member having an outer portion thereof which is in contact with the water in said tank;
an upstanding nuclear reactor vessel, having an upper section and a lower section, positioned within said compartment of said first containment member;
said nuclear reactor vessel having an interior compartment formed therein with said interior compartment of said nuclear reactor vessel having upper and lower sections;
said interior compartment of said reactor vessel having a fluid therein;
said first containment member and said nuclear reactor vessel being spaced-apart to define an air compartment therebetween with said air compartment having an upper end and a lower end;
a first cooling tube assembly having upper and lower ends;
said upper end of said first cooling tube assembly being in fluid communication with said interior compartment of said nuclear reactor vessel at said upper section of said nuclear reactor vessel;
said cooling tube assembly extending from said upper section of said nuclear reactor vessel downwardly through said air compartment to said lower section of said nuclear reactor vessel;
said lower end of said cooling tube assembly being in communication with said interior compartment of said reactor vessel at said lower section of said reactor vessel;
said first containment member having a first water inlet opening formed therein at said lower end of said first containment member, which is in communication with said air compartment;
said first containment member having a normally closed gate mounted on said lower end of said first containment member which selectively closes said first water inlet opening;
said normally closed gate when moved to an open position, permitting water in said tank to flow into said air compartment to come into contact with said cooling tube assembly therein and said reactor vessel;
said first containment member having a second water inlet opening formed therein;
a normally closed valve associated with said second water inlet opening;
said normally closed valve, when moved to its open position, permitting water in said tank to flow into said air compartment to come into contact with said cooling tube assembly therein and said reactor vessel;
a heat exchanger;
said heat exchanger including a second containment member extending therearound;
said heat exchanger including a heat exchanger vessel positioned in said second containment member;
said heat exchanger vessel and said second containment member defining an air chamber therebetween;

said vessel of said heat exchanger having a fluid therein;
a horizontally disposed first tube, having inner and outer ends;
said inner end of said first tube being in fluid communication with said interior compartment of said reactor vessel;
said outer end of said first tube being positioned in said interior compartment of said vessel of said heat exchanger;
a second tube having first and second ends;
said first end of said second tube being in fluid communication with said outer end of said first tube in said vessel of said heat exchanger;
a horizontally disposed third tube having inner and outer ends;
said inner end of said third tube being in fluid communication with said interior compartment of said reactor vessel;
said outer end of said third tube being positioned in said interior compartment of said vessel of said heat exchanger;
said outer end of said third tube being in fluid communication with said second end of said second tube;
a fourth tube having first and second ends;
said first end of said fourth tube being in fluid communication with said interior compartment of said vessel of said heat exchanger;
a device in said barge having a fluid inlet side and a fluid discharge side;
said second end of said fourth tube being in communication with said fluid inlet side of said device;
a fifth tube having first and second ends;
said first end of said fifth tube being in fluid communication with said interior compartment of said vessel of said heat exchanger; and
said second end of said fifth tube being in communication with said fluid discharge side of said device.

9. The floating nuclear reactor of claim 8 wherein said device is a turbine which is connected to a generator.

10. The floating nuclear reactor of claim 8 wherein an electric close open valve, which is normally open, is imposed in said first tube between said reactor vessel and said vessel of said heat exchanger and wherein an electric open close valve, which is normally open, is imposed in said third tube between said reactor vessel and said vessel of said heat exchanger.

11. A nuclear reactor, comprising:
a barge, having a first end, a second end, a first side and a second side, floatably positioned on a body of water;
an upstanding nuclear reactor positioned on said barge;
said nuclear reactor including a first containment member having a central section, an upper section, a lower section and an interior compartment;
an upstanding nuclear reactor vessel, having an upper section and a lower section, positioned within said compartment of said first containment member;
said nuclear reactor vessel having an interior compartment formed therein with said interior compartment of said nuclear reactor vessel having upper and lower sections;
said interior compartment of said reactor vessel having a fluid therein;
said first containment member and said nuclear reactor vessel being spaced-apart to define an air compartment therebetween with said air compartment having an upper end and a lower end;
a cooling tube assembly having upper and lower ends;
said cooling tube assembly being positioned in said air compartment;
said upper end of said cooling tube assembly being in fluid communication with said interior compartment of said nuclear reactor vessel at said upper section of said nuclear reactor vessel;
said cooling tube assembly extending from said upper section of said nuclear reactor vessel downwardly through said air compartment to said lower section of said nuclear reactor vessel;
said lower end of said cooling tube assembly being in communication with said interior compartment of said reactor vessel at said lower section of said reactor vessel;
said first containment member having a first water inlet opening formed therein which is in fluid communication with the body of water;
said first water inlet opening of said first containment member being normally closed by a gate member;
said gate member being movable between closed and open positions;
said gate member, when in said position, permitting water from the body of water to enter said air compartment to cool said cooling tube assembly and the contents thereof;
a valve, movable between a normally closed position and an open position, imposed in said cooling tube assembly at said upper end thereof;
said valve, when in said closed position, preventing fluid flow from said cooling tube assembly into said interior compartment of said reactor vessel; and
said valve, when in said open position, permitting fluid from said interior compartment of said reactor vessel to flow into said cooling tube assembly.

12. The nuclear reactor of claim 11 wherein said valve is an electric open-close valve.

13. The nuclear reactor of claim 11 wherein said valve is a one-way valve.

14. The nuclear reactor of claim 11 wherein a valve, which is movable between a normally closed position and an open position, is imposed in said cooling tube assembly at said lower end thereof and wherein said valve, when in said closed position, prevents the flow of fluid from said interior compartment of said reactor vessel into said lower end of said cooling tube assembly, and wherein said valve, when in said open position, permitting fluid to flow from said cooling tube assembly into said interior compartment of said reactor vessel.

15. The nuclear reactor of claim 14 wherein said valve is an electric open-close valve.

16. The nuclear reactor of claim 14 wherein said valve is a one-way valve.

17. The nuclear reactor of claim 11 wherein at least one normally closed valve is imposed in said upper end of said cooling tube assembly and wherein at least one normally closed valve is imposed in said lower end of said cooling tube assembly.

18. A floating nuclear reactor, comprising:
a tank having a bottom wall, an upstanding first end wall, an upstanding second end wall, an upstanding first side wall and an upstanding second side wall;
each of said first end wall, said second end wall, said first side wall and said second side wall having an outer side, an inner side, a lower end and an upper end;
said tank being buried in the ground;
said tank having water therein;
a barge floatably positioned in said tank;

said barge including:
 (a) an upstanding first end wall having an upper end, a lower end, a first side, a second side, an inner side and an outer side;
 (b) an upstanding first side wall having an upper end, a lower end, a first end, a second end, an inner side and an outer side;
 (c) said first end of first side wall of said barge being joined to said second end of said first end wall of said barge and extending therefrom;
 (d) an upstanding second side wall having an upper end, a lower end, a first end, a second end, an inner side and an outer side;
 (e) said first end of said second side wall of said barge being joined to said first end of said first end wall of said barge and extending therefrom;
 (f) a horizontally disposed bottom wall having a first end, a second end, a first side and a second side;
 (g) said bottom wall extending between said lower ends of said first end wall, said first side wall and said second side wall of said barge;
 (h) said barge having an open end at said second ends of said first side wall, said second side wall and said second end of said bottom wall;
a plurality of suspension assemblies connecting said tank and said barge;
said suspension assemblies permitting said barge to move upwardly and downwardly with respect to said tank while maintaining said barge in a level condition should said barge or said nuclear reactor be subjected to an outside force such as an airplane strike, a missile strike, high winds or an earthquake;
said suspension assemblies also preventing said barge from coming into contact with said tank;
each of said suspension assemblies including:
 (a) a vertically disposed guide track, having upper and lower ends, mounted on said inner side of the wall of the tank;
 (b) a flexible chain assembly having inner and outer ends;
 (c) said outer end of said chain assembly being vertically movably secured to said guide track;
 (d) said inner end of said chain assembly being fixed to said barge;
said flexible chain assembly including an upper chain member having inner and outer ends, a lower chain member having inner and outer ends, and an intermediate chain member having inner and outer ends;
said upper chain member extending upwardly and inwardly from said guide track to said barge;
said lower chain member extending downwardly and inwardly from said guide track to said barge; and
said intermediate chain member extending horizontally inwardly from said guide track to said barge.

19. A floating nuclear reactor, comprising:
a tank having a bottom wall, an upstanding first end wall, an upstanding second end wall, an upstanding first side wall and an upstanding second side wall;
each of said first end wall, said second end wall, said first side wall and said second side wall having an outer side, an inner side, a lower end and an upper end;
said tank being buried in the ground;
said tank having water therein;
a barge floatably positioned in said tank;
said barge including:
 (a) an upstanding first end wall having an upper end, a lower end, a first side, a second side, an inner side and an outer side;
 (b) an upstanding first side wall having an upper end, a lower end, a first end, a second end, an inner side and an outer side;
 (c) said first end of first side wall of said barge being joined to said second end of said first end wall of said barge and extending therefrom;
 (d) an upstanding second side wall having an upper end, a lower end, a first end, a second end, an inner side and an outer side;
 (e) said first end of said second side wall of said barge being joined to said first end of said first end wall of said barge and extending therefrom;
 (f) a horizontally disposed bottom wall having a first end, a second end, a first side and a second side;
 (g) said bottom wall extending between said lower ends of said first end wall, said first side wall and said second side wall of said barge;
 (h) said barge having an open end at said second ends of said first side wall, said second side wall and said second end of said bottom wall;
a plurality of suspension assemblies connecting said tank and said barge;
each of said suspension assemblies includes:
 (a) a vertically disposed guide track, having upper and lower ends, mounted on said inner side of the wall of the tank;
 (b) a flexible chain assembly having inner and outer ends;
 (c) said outer end of said chain assembly being vertically movably secured to said guide track; and
 (d) said inner end of said chain assembly being fixed to said barge;
said flexible chain assembly including an upper chain member and a lower chain member;
said upper chain member extending upwardly and inwardly from said guide track to said barge;
said lower chain member extending downwardly and inwardly from said guide track to said barge;
said suspension assemblies permitting said barge to move upwardly and downwardly with respect to said tank while maintaining said barge in a level condition should said barge or said nuclear reactor be subjected to an outside force such as an airplane strike, a missile strike, high winds or an earthquake;
said suspension assemblies also preventing said barge from coming into contact with said tank;
each of said suspension systems including:
 (a) a vertically disposed guide track, having upper and lower ends, mounted on said inner side of the wall of the tank;
 (b) a flexible chain assembly having inner and outer ends;
 (c) said outer end of said chain assembly being vertically movably secured to said guide track; and
 (d) said inner end of said chain assembly being fixed to said barge;
said flexible chain assembly including an upper chain member and a lower chain member;
said upper chain member extending upwardly and inwardly from said guide track to said barge; and
said lower chain member extending downwardly and inwardly from said guide track to said barge.

20. A floating nuclear reactor, comprising:
a tank having a bottom wall, an upstanding first end wall, an upstanding second end wall, an upstanding first side wall and an upstanding second side wall;
each of said first end wall, said second end wall, said first side wall and said second side wall having an outer side, an inner side, a lower end and an upper end;
said tank being buried in the ground;
said tank having water therein;
a barge floatably positioned in said tank;
said barge including:
- (a) an upstanding first end wall having an upper end, a lower end, a first side, a second side, an inner side and an outer side;
- (b) an upstanding first side wall having an upper end, a lower end, a first end, a second end, an inner side and an outer side;
- (c) said first end of first side wall of said barge being joined to said second end of said first end wall of said barge and extending therefrom;
- (d) an upstanding second side wall having an upper end, a lower end, a first end, a second end, an inner side and an outer side;
- (e) said first end of said second side wall of said barge being joined to said first end of said first end wall of said barge and extending therefrom;
- (f) a horizontally disposed bottom wall having a first end, a second end, a first side and a second side;
- (g) said bottom wall extending between said lower ends of said first end wall, said first side wall and said second side wall of said barge;
- (h) said barge having an open end at said second ends of said first side wall, said second side wall and said second end of said bottom wall;

a plurality of suspension assemblies connecting said tank and said barge;
said suspension assemblies permitting said barge to move upwardly and downwardly with respect to said tank while maintaining said barge in a level condition should said barge or said nuclear reactor be subjected to an outside force such as an airplane strike, a missile strike, high winds or an earthquake;
said suspension assemblies also preventing said barge from coming into contact with said tank;
each of said suspension assemblies including:
- (a) a vertically disposed guide track, having upper and lower ends, mounted on said outer side of the wall of the barge;
- (b) a flexible chain assembly having inner and outer ends;
- (c) said inner end of said chain assembly being vertically movably secured to said guide track;
- (d) said outer end of said chain assembly being fixed to said tank;

said flexible chain assembly including an upper chain member having inner and outer ends, a lower chain member having inner and outer ends, and an intermediate chain member having inner and outer ends;
said upper chain member extending upwardly and outwardly from said guide track to said barge;
said lower chain member extending downwardly and outwardly from said guide track to said tank; and
said intermediate chain member extending horizontally outwardly from said guide track to said tank.

21. A floating nuclear reactor, comprising:
a tank having a bottom wall, an upstanding first end wall, an upstanding second end wall, an upstanding first side wall and an upstanding second side wall;
each of said first end wall, said second end wall, said first side wall and said second side wall having an outer side, an inner side, a lower end and an upper end;
said tank being buried in the ground;
said tank having water therein;
a barge floatably positioned in said tank;
said barge including:
- (a) an upstanding first end wall having an upper end, a lower end, a first side, a second side, an inner side and an outer side;
- (b) an upstanding first side wall having an upper end, a lower end, a first end, a second end, an inner side and an outer side;
- (c) said first end of first side wall of said barge being joined to said second end of said first end wall of said barge and extending therefrom;
- (d) an upstanding second side wall having an upper end, a lower end, a first end, a second end, an inner side and an outer side;
- (e) said first end of said second side wall of said barge being joined to said first end of said first end wall of said barge and extending therefrom;
- (f) a horizontally disposed bottom wall having a first end, a second end, a first side and a second side;
- (g) said bottom wall extending between said lower ends of said first end wall, said first side wall and said second side wall of said barge;
- (h) said barge having an open end at said second ends of said first side wall, said second side wall and said second end of said bottom wall;

a plurality of suspension assemblies connecting said tank and said barge;
said suspension assemblies permitting said barge to move upwardly and downwardly with respect to said tank while maintaining said barge in a level condition should said barge or said nuclear reactor be subjected to an outside force such as an airplane strike, a missile strike, high winds or an earthquake;
said suspension assemblies also preventing said barge from coming into contact with said tank;
each of said suspension assemblies including:
- (a) a vertically disposed guide track, having upper and lower ends, mounted on said outer side of the wall of the barge;
- (b) a flexible chain assembly having inner and outer ends;
- (c) said inner end of said chain assembly being vertically movably secured to said guide track;
- (d) said outer end of said chain assembly being fixed to said tank;

said flexible chain member including an upper chain member having inner and outer ends and a lower chain member having inner and outer ends;
said upper chain member extending upwardly and outwardly from said guide track to said tank; and
said lower chain member extending downwardly and outwardly from said guide track to said tank.

\* \* \* \* \*